(12) United States Patent
Rogers et al.

(10) Patent No.: US 9,975,729 B2
(45) Date of Patent: May 22, 2018

(54) ELEVATOR SYSTEM USING DYNAMIC BRAKING

(75) Inventors: Kyle W. Rogers, Arlington, MA (US); Daryl J. Marvin, Farmington, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 414 days.

(21) Appl. No.: 14/422,775

(22) PCT Filed: Aug. 22, 2012

(86) PCT No.: PCT/US2012/051837
§ 371 (c)(1),
(2), (4) Date: Feb. 20, 2015

(87) PCT Pub. No.: WO2014/031112
PCT Pub. Date: Feb. 27, 2014

(65) Prior Publication Data
US 2015/0191327 A1    Jul. 9, 2015

(51) Int. Cl.
*B66B 1/06* (2006.01)
*B66B 1/30* (2006.01)
*B66B 1/32* (2006.01)
*B66B 5/00* (2006.01)
*G01P 3/44* (2006.01)
*H02P 3/22* (2006.01)

(52) U.S. Cl.
CPC ............ *B66B 1/30* (2013.01); *B66B 1/308* (2013.01); *B66B 1/32* (2013.01); *B66B 5/0043* (2013.01); *G01P 3/44* (2013.01); *H02P 3/22* (2013.01)

(58) Field of Classification Search
CPC .. B66B 1/30; B66B 1/308; B66B 1/32; B66B 5/0043; G01P 3/44; H02P 3/22

USPC .......................................................... 187/289
See application file for complete search history.

(56) References Cited

U.S. PATENT DOCUMENTS 7,075,257 B2    7/2006    Carrier et al.
8,207,700 B2    6/2012    Syrman et al.

FOREIGN PATENT DOCUMENTS

| EP | 2062348 A1 | 5/2009 |
|---|---|---|
| EP | 2528226 A1 | 11/2012 |
| JP | 2002369564 A | 12/2002 |
| JP | 2008154386 A | 7/2008 |
| JP | 2010119253 A | 5/2010 |
| JP | 2011062035 A | 3/2011 |
| KR | 20120086742 A | 8/2012 |
| WO | 2011051571 A1 | 5/2011 |
| WO | 2011146075 A1 | 11/2011 |

(Continued)

OTHER PUBLICATIONS

European Office Action for application EP 12883351.4, dated Sep. 15, 2016.

(Continued)

*Primary Examiner* — Jeffrey Donels
(74) *Attorney, Agent, or Firm* — Cantor Colburn LLP

(57) ABSTRACT

An elevator system includes a motor having a plurality of motor windings; a plurality of braking switches coupled to the motor windings, the braking switches coupling the motor windings to a common electrical point; a sensor coupled to the motor, the sensor providing a sensed signal indicative of a parameter of the motor; and a controller providing a braking signal to the braking switches in response to the sensed signal to selectively control the braking switches to short the motor windings.

14 Claims, 3 Drawing Sheets

(56) References Cited

FOREIGN PATENT DOCUMENTS

WO      2011146076  A1    11/2011

OTHER PUBLICATIONS

European Search Report for application EP 12883351.4, dated Jul. 7, 2015, 9 pages.
International Search Report for application PCT/US2012/051837, dated Mar. 15, 2013, 5 pages.
Written Opinion for application PCT/US2012/051837, dated Mar. 15, 2013, 5 pages.

ELEVATOR SYSTEM USING DYNAMIC BRAKING

BACKGROUND OF THE INVENTION

Embodiments of this invention generally relate to an elevator system, and more particularly, to an elevator system that employs dynamic braking.

Dynamic braking is a technique used to slow a motor through the use of back electromotive force (emf). Generally, dynamic braking operates by shorting terminals of a permanent magnetic machine, allowing the back emf to resist rotation of the rotor. Dynamic braking is used in a wide variety of applications. Exemplary existing systems use switchover relays and power resistors to connect motor leads together in a star connection. This type of design is used in systems where a DC power source remains charged at all times. Such systems require extremely high cost relays to handle the currents generated by the active DC source. Another exemplary existing design uses power resistors to short the DC power source rather than the motor windings.

SUMMARY OF THE INVENTION

According to an exemplary embodiment an elevator system includes a motor having a plurality of motor windings; a plurality of braking switches coupled to the motor windings, the braking switches coupling the motor windings to a common electrical point; a sensor coupled to the motor, the sensor providing a sensed signal indicative of a parameter of the motor; and a controller providing a braking signal to the braking switches in response to the sensed signal to selectively control the braking switches to short the motor windings.

Alternatively, in this or other aspects, the braking switches couple the motor windings in a star configuration.

Alternatively, in this or other aspects, the braking switches are transistors.

Alternatively, in this or other aspects, the braking switches are MOSFETs.

Alternatively, in this or other aspects, the sensed signal represents current at the motor.

Alternatively, in this or other aspects, the sensed signal represents speed at the motor.

Alternatively, in this or other aspects, the sensed signal represents current and speed at the motor.

Alternatively, in this or other aspects, the controller compares the sensed signal to a threshold and generates the braking signal in response to comparing the sensed signal to the threshold.

Alternatively, in this or other aspects, the controller determines if the elevator system is in maintenance mode, and provides the braking signal only when the elevator system is in maintenance mode.

According to another exemplary embodiment, a method for providing dynamic braking in an elevator system includes sensing a parameter of a motor; determining an operating mode of the elevator system; and selectively shorting windings of the motor to a common electrical point in response to sensing the parameter and determining the operating mode of the elevator system.

Alternatively, in this or other aspects, the parameter of the motor includes sensing current at the motor.

Alternatively, in this or other aspects, sensing the parameter of the motor includes sensing speed at the motor.

Alternatively, in this or other aspects, sensing the parameter of the motor includes sensing current at the motor and speed at the motor.

Alternatively, in this or other aspects, comparing the parameter to a threshold and selectively shorting windings of the motor to the common electrical point in response to comparing the parameter to the threshold.

Alternatively, in this or other aspects, the controller determines if the system is in maintenance mode, and provides the braking signal only when the system is in maintenance mode.

According to another exemplary embodiment, an elevator system includes a motor having a plurality of motor windings; a plurality of braking switches coupled to the motor windings, the braking switches coupling the motor windings to a common electrical point; and a controller providing a braking signal to the braking switches in response to the system being in a maintenance mode and a mechanical brake applied.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description of the invention describes exemplary embodiments of the invention, together with some of the advantages and features thereof, by way of example with reference to the drawings.

DETAILED DESCRIPTION OF THE INVENTION

Figure 1:
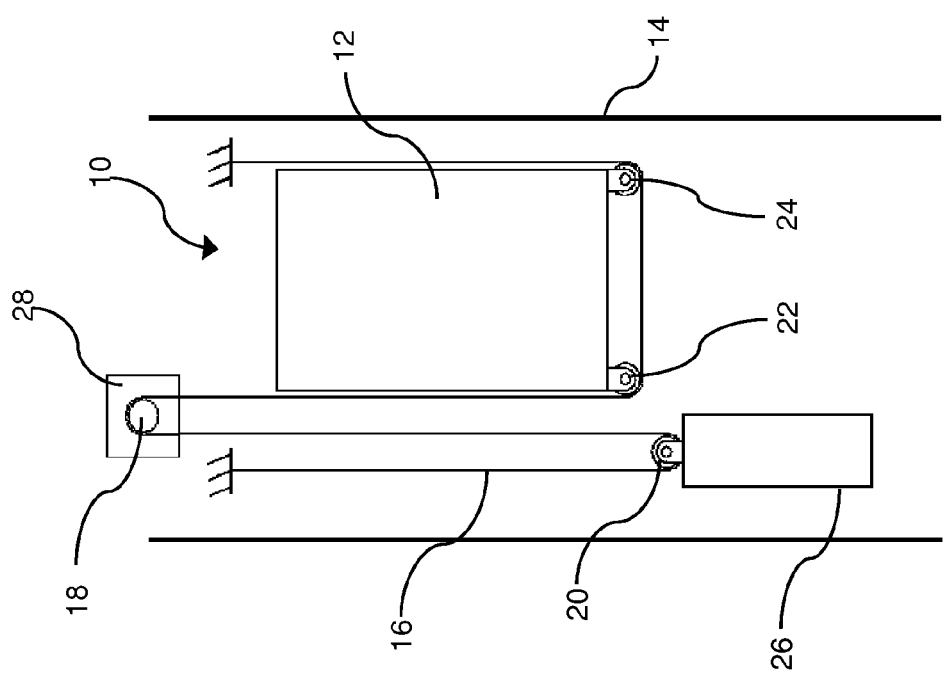
FIG. 1 illustrates an elevator system according to an embodiment of the invention.

FIG. 1 illustrates an example elevator system 10 including an elevator car 12 coupled to one or more lifting and/or suspending belts or ropes, generally referred to herein as belt 16. Belt 16 may be a coated, steel belt in embodiments of the invention. Elevator car 12 is suspended or supported in a hoistway 14 with belt 16. Belt 16 is routed around the various components of the elevator system 10 by interacting with a traction sheave 18 and idler sheaves 20, 22, 24. Belt 16 may also be connected to a counterweight 26, which is used to help balance the elevator system 10 and reduce the difference in belt tension on both sides of the traction sheave 18 during operation. Belt 16 supports the weight of the car 12 and the counterweight 26 in a known manner.

Traction sheave 18 is driven by a machine 28. Movement of traction sheave 18 by the machine 28 drives, moves and/or propels (through traction) belt 16 to move car 12. The idler sheaves 20, 22, 24 are not driven by a machine 28, but help guide belt 16 around the various components of the elevator system 10. One or more of the idler sheaves 20, 22, 24 may have a convex shape or crown along its axis of rotation to assist in keeping belt 16 centered, or in a desired position, along the idler sheaves 20, 22, 24.

Figure 2:
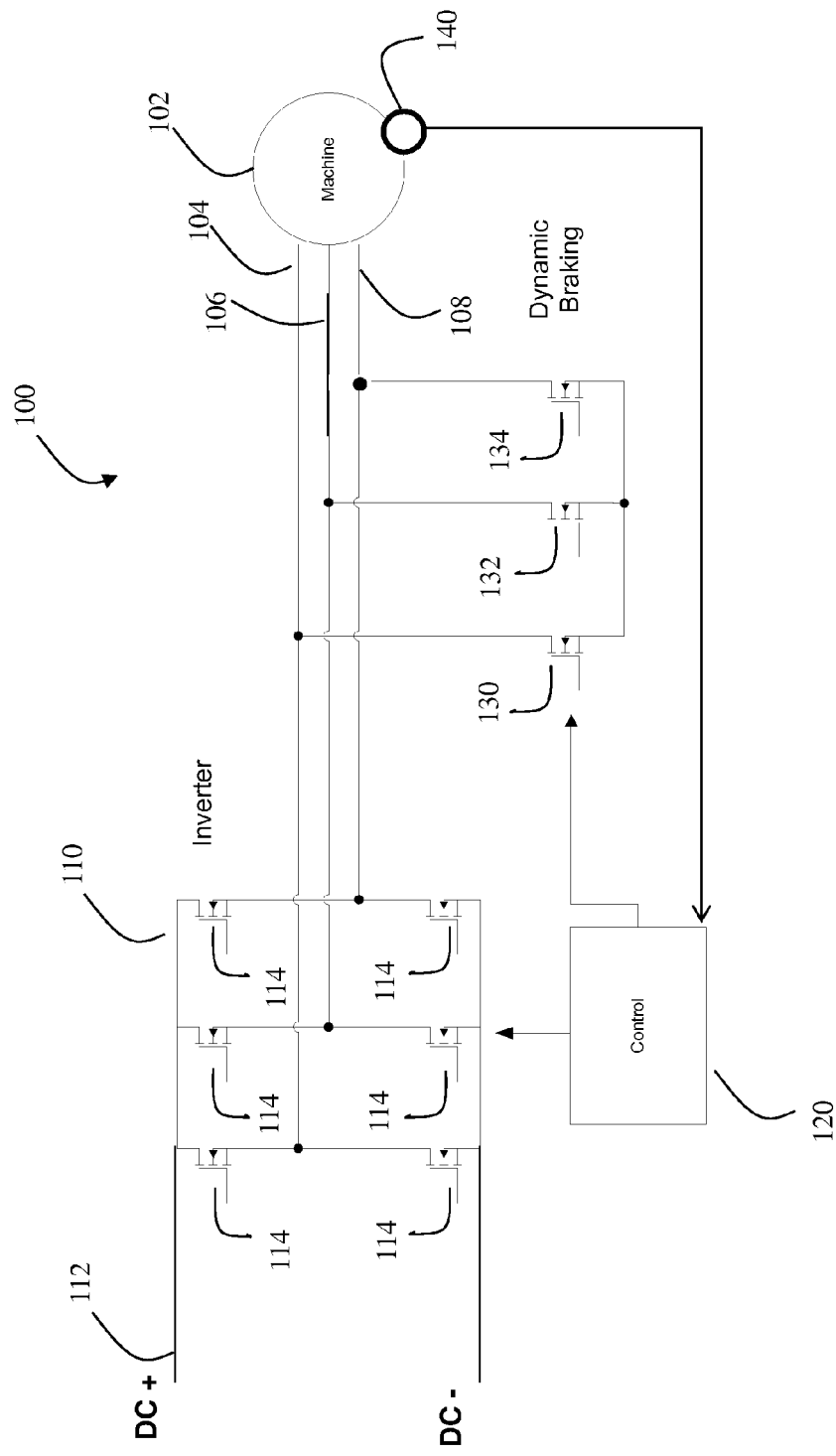
FIG. 2 is a schematic diagram of an exemplary system for providing dynamic braking.

FIG. 2 is a schematic diagram of an exemplary system 100 for providing dynamic braking to an elevator system. Dynamic braking may be implemented when the elevator system is in a maintenance mode, which is intended to include installation, maintenance, inspection and upgrade, unless otherwise indicated. System 100 includes a motor 102, which may be part of machine 28 of FIG. 1. Motor 102 is a multiphase machine having three motor windings 104, 106, and 108. Motor windings 104, 106, and 108 are coupled to phase legs of an inverter 110.

Inverter 110 is power by a DC bus 112. As known in the art, inverter 110 includes a number of switches 114. Switches 114 may be MOSFETs, but other types of switches may be used, such as IGBTs, IGCTs etc. Inverter 110 operates under the control of a controller 120. Controller 120 may be a general-purpose microprocessor based controller, executing computer program code in a storage medium to perform the operations described herein. Alternatively, controller 120 may be implemented in hardware (e.g., FPGA, ASIC) or a combination of hardware/software. Controller 120 is coupled a gate input of each of switches 114. By applying a drive signal to the gate inputs, controller 120 turns switches 114 on and off to provide an AC waveform to motor 102 and control the speed of motor 102.

System 100 also includes braking switches 130, 132 and 134. Braking switches 130, 132 and 134 may be MOSFETs, but other types of switches may be used, such as IGBTs, IGCTs etc. Braking switches 130, 132 and 134 connect motor windings 104, 106, and 108 in a star configuration, effectively shorting the motor windings together at a common electrical point. When the motor windings 104, 106, and 108 are shorted together, back emf of motor 102 provides a braking force to the motor.

Controller 120 is coupled to a gate input of each of braking switches 130, 132 and 134. By applying a braking signal to the gate inputs, controller 120 turns switches 130, 132 and 134 on and off to selectively short the motor windings. This allows controller 120 to control the braking force generated by motor 102. In an exemplary embodiment, controller 120 use pulse width modulation (PWM) to apply a pulsed braking signal to braking switches 130, 132 and 134. This pulsed braking signal selectively turns switches 130, 132 and 134 on and off, thereby selectively applying the braking force at motor 102. It is understood that other braking signals may be applied, and embodiments are not limited to PWM braking signals.

System 100 also includes at least one sensor 140 that provides a sensed signal to controller 120. Sensor 140 may sense rotational speed of motor 102 and provide a sensed speed signal to controller 120. Sensor 140 may sense current in the motor windings, and provide a sensed current signal to controller 120. Alternatively, both speed and current may be sensed at motor 120, and a sensed speed signal a sensed current signal provide to controller 120. Other parameters that indicate the operational state of motor 102 may be sensed and provided to controller 120 in the form of a sensed signal. As described herein, controller 120 uses the sensed signal to control braking signals applied to braking switches 130, 132 and 134.

Figure 3:
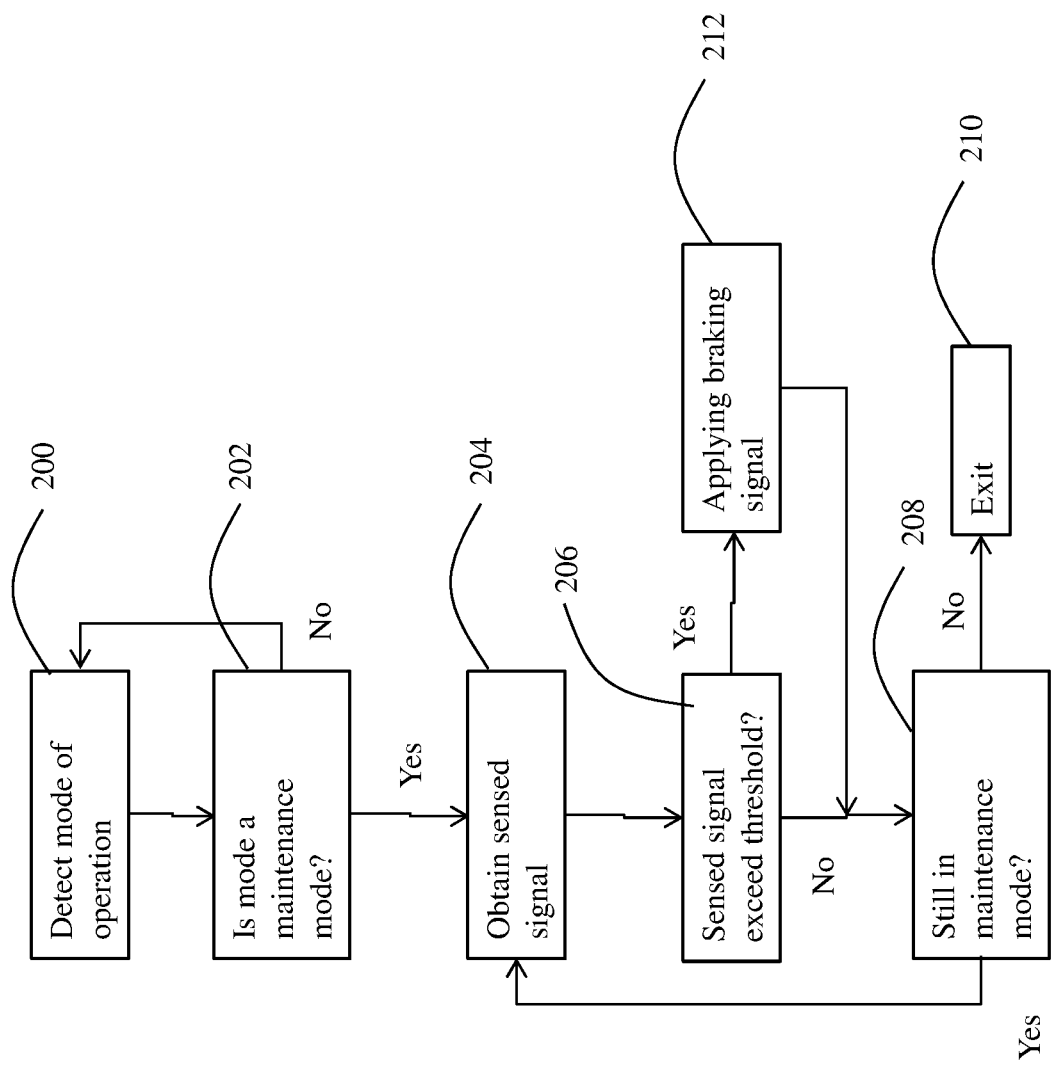
FIG. 3 is a flowchart of an exemplary process for providing dynamic braking.

FIG. 3 is a flowchart of an exemplary process for providing dynamic braking in the system of FIG. 2. The process is implemented by controller 120. At 200, controller 120 detects the mode of operation of the elevator system. The mode of operation may be indicated by a group controller or master controller providing an input to controller 120. If the mode of operation is not maintenance mode, then at 202 the process loops back to 200. Maintenance mode includes modes such as installation, maintenance, inspection and upgrade of one or more components of the elevator system.

If at 202 controller 120 determines the elevator system is operating in a maintenance mode, flow proceeds to 204 where controller 120 obtains the sensed signal from sensor 140. As noted previously, the sensed signal may represent a plurality of parameters, such as current in motor windings or rotational speed of the motor 102. At 206, the sensed signal is compared to a threshold to determine if dynamic braking is warranted. The threshold may be set to allow some rotation of motor 102, or to accommodate sensor tolerances. For example, a small amount of current may be allowed to flow in the motor windings without requiring braking. Similarly, some rotation of the motor may be permitted in maintenance mode. The threshold may vary depending on the desired operation of car 12. For example, car 12 is moved during some maintenance tasks and the threshold may be defined to allow movement of the car (e.g., up to a maximum speed) without implementing dynamic braking. Thus, the threshold will vary depending on the expected operation of the elevator system.

If the sensed signal does not exceed the applicable threshold, flow proceeds to 208 where it is determined if the elevator system is still in maintenance mode. If so, flow proceed to 204 where the sensed signal is monitored. If not, flow proceeds to 210 where the process ends.

If at 206, the sensed signal exceeds the threshold, flow proceeds to 212 where dynamic braking is applied. This entails applying the braking signal to braking switches 130, 132 and 134 to selectively short motor windings 104, 106 and 108. This results in braking of motor 102 due to back emf. While the system remains in maintenance mode at 208, the process loops back through 204 and 206 to continually monitor the sensed signal and compare the sensed signal to the threshold. This allows controller 120 to continually adjust the braking signal in response to the sensed signal in a feedback loop. For example, if the sensed signal increases in magnitude, then the braking signal can be proportionally increased, for example, with a larger pulse width. This process loop continues until the system exits maintenance mode.

In an alternate embodiment, steps 204 and 206 are eliminated and controller 120 proceeds directly to 212 when maintenance mode is detected and instead of dynamic braking, a mechanical brake is applied. This mode of operation removes the intelligent control of steps 204 and 206 and provides a backup to the mechanical brake. Since the braking signals are applied to braking switches 130, 132 and 134 upon entering maintenance mode, the dynamic braking is present if the mechanical brake should fail.

The use of braking switches 130, 132 and 134 provides the high current capabilities needed for a low voltage machine at a much lower cost level than using relays. These braking switches provide significantly increased lifetime over relays, as they are designed to be switched millions of times. Additionally braking switches 130, 132 and 134 require very little energy to be held in a conducting state. By being able to control the braking switches, it is possible to enable the switches only in maintenance mode, thereby increasing the efficiency of the system. Braking force is provided to motor 102 without disabling the upper and/or lower gate drives 114 on the inverter 110. In systems that do not require dynamic braking, switches 130, 132 and 134 can simply be depopulated, removing the majority of the cost burden from the drive.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but defined by the scope of the appended claims.

The invention claimed is:

1. A system comprising:
a motor having a plurality of motor windings;
a plurality of braking switches coupled to the motor windings, the braking switches coupling the motor windings to a common electrical point;
a sensor coupled to the motor, the sensor providing a sensed signal indicative of a parameter of the motor; and
a controller providing a braking signal to the braking switches in response to the sensed signal to selectively control the braking switches to short the motor windings;
wherein the controller compares the sensed signal to a threshold and generates the braking signal in response the sensed signal exceeding the threshold.

2. The system of claim 1 wherein the braking switches couple the motor windings in a star configuration.

3. The system of claim 1 wherein the braking switches are transistors.

4. The system of claim 3 wherein the braking switches are MOSFETs.

5. The system of claim 1 wherein the sensed signal represents current at the motor.

6. The system of claim 1 wherein the sensed signal represents speed at the motor.

7. The system of claim 1 wherein the sensed signal represents current and speed at the motor.

8. The system of claim 1 wherein the controller determines if the elevator system is in maintenance mode, and provides the braking signal only when the elevator system is in maintenance mode.

9. A method for providing dynamic braking in an elevator system, the method comprising:
sensing a parameter of a motor;
determining an operating mode of the elevator system; and
selectively shorting windings of the motor to a common electrical point in response to sensing the parameter and determining the operating mode of the elevator system;
wherein selectively shorting windings of the motor comprises comparing the parameter to a threshold and selectively shorting windings of the motor to the common electrical point in response to the parameter exceeding the threshold.

10. The method of claim 9 wherein sensing the parameter of the motor includes sensing current at the motor.

11. The method of claim 9 wherein sensing the parameter of the motor includes sensing speed at the motor.

12. The method of claim 9 wherein sensing the parameter of the motor includes sensing current at the motor and speed at the motor.

13. The elevator system of claim 9 wherein the controller determines if the system is in maintenance mode, and provides the braking signal only when the system is in maintenance mode.

14. An elevator system comprising:
a motor having a plurality of motor windings;
a plurality of braking switches coupled to the motor windings, the braking switches coupling the motor windings to a common electrical point; and
a controller providing a braking signal to the braking switches in response to the system being in a maintenance mode and a mechanical brake applied;
wherein the controller determines if the system is in maintenance mode, and provides the braking signal only when the system is in maintenance mode.

* * * * *